United States Patent [19]

Racciato et al.

[11] 4,257,768

[45] Mar. 24, 1981

[54] NOVEL BLEND OF ALGIN AND TKP

[75] Inventors: Joseph S. Racciato, San Diego; Robert I. Yin, La Jolla, both of Calif.

[73] Assignee: Merck & Co., Inc., Rahway, N.J.

[21] Appl. No.: 959,121

[22] Filed: Nov. 9, 1978

[51] Int. Cl.$^3$ .......................... C08L 5/04; D06P 1/46
[52] U.S. Cl. ........................ 8/561; 106/208; 106/209
[58] Field of Search ............ 106/205, 208, 209; 536/1, 114; 252/316; 8/7, 91

[56] References Cited

U.S. PATENT DOCUMENTS

| | | | |
|---|---|---|---|
| 3,287,350 | 11/1966 | Deguchi | 536/1 |
| 3,399,189 | 8/1968 | Gordan | 536/1 |
| 3,503,769 | 3/1970 | McDowell | 106/208 |
| 4,089,646 | 5/1978 | Habereder | 8/7 |

OTHER PUBLICATIONS

Chem. Abstract 47:9640i.
Chem. Abstract 55:19237i.
Industrial Gums, Whistler, pp. 73, 377 & 387.
McNeely et al. and Rao et al., *Algin* (Chap. V) and *Tamarind* (Chap. XVIII), N. Y. and London, Academic Press, 1973, pp. 73 and 377.
Artur Urbank et al., "Processes Involved in Particulate".

*Primary Examiner*—Theodore Morris
*Attorney, Agent, or Firm*—Gabriel Lopez; Hesna J. Pfeiffer; Julian S. Levitt

[57] ABSTRACT

Novel blends of algin and TKP are disclosed. The blends are useful in commercial gum applications where thickening, suspending, emulsifying, stabilizing, film-forming, and gel-forming properties are needed. They are particularly useful in the paper and textile industries.

22 Claims, No Drawings

NOVEL BLEND OF ALGIN AND TKP

BACKGROUND OF THE INVENTION

Algin is a water-soluble polysaccharide found in all species of Phaeophyceae, brown algae. The generic term algin designates the derivatives of alginic acid chemically extracted from Phaeophyceae. The derivatives of alginic acid include varied soluble salts (e.g., sodium alginate) and salts of ethers (e.g., propylene glycol alginate); these derivatives, i.e., algin, are stored in their dry-powdered form. Algin is used in commercial gum applications for its thickening, suspending, emulsifying, stabilizing, adhesive, film-forming, and gel-forming properties.

Tamarind kernel powder is a commercially available product made by husking and milling the seed kernels of the tree *Tamarindus* indica Linn.

SUMMARY OF THE INVENTION

It has now been found that a novel composition produced by blending algin and TKP (defined below) wherein the ratio of algin to TKP on a weight:weight basis can range from about 90:10 to about 5:95, exhibits unexpected synergistic effects as measured by its physical properties. The blend of algin and TKP is identified as synergistic by improved viscosity measurements on a Brookfield viscometer. The blend's synergistic properties are further evidenced by improved film-forming, ink holdout, and water-retention properties (recognized parameters in the paper industry) and by improved tensile strength and elongation of properties of films (recognized parameters for warp sizing used in the textile industry). Although the synergistic effects of algin and TKP are exhibited over a broad range of weight:weight ratios, blends low in algin are preferred; i.e., algin:TKP<50:50. Most preferred are blends in the range 20:80 to 5:95.

DETAILED DESCRIPTION OF THE INVENTION

As used herein, algin is a generic designation for alginic acid and derivatives of alginic acid, including soluble salts (specifically sodium alginates) and soluble salts of its ethers (specifically propylene glycol alginates).

As used herein, TKP refers to (1) tamarind kernel powder, a commercially available product obtained from the seed kernels of the tree *Tamarindus indica* Linn ; (2) cold-water soluble tamarind kernel powder (CWSTG) prepared by mixing crude tamarind kernel powder in water at a concentration of 0.1 to 75.0% (preferably 20-50%), heating the solution to a temperature of 35°-130° C. (preferably 70°-100° C.) until a paste is formed, then drying and milling the resulting product, which is cold water soluble tamarind kernel powder; (3) purified tamarind kernel powder as taught by U.S. Pat. No. 3,399,189 for obtaining the tamarind polysaccharide extract and by U.S. Pat. No. 3,287,350 for extraction of the tamarind polysaccharide as tamarind seed jellose (TSJ); and (4) other tamarind kernel powder constituents, i.e., the residual after the tamarind polysaccharide has been removed, viz. a combination of proteins, fiber, fat, inorganic salts, free sugars, and tannins.

CWSTG is taught and claimed in a copending application entitled "Cold-Water Soluble Tamarind Gum", Ser. No. 959,120, filed Nov. 9, 1978, pending group 140. Said application is incorporated herein by reference for its teaching of how to make CWSTG.

CWSTG is made by mixing TKP in water at concentrations of 0.1 to 75%, heating this mix to a temperature of 35-130° C., and then drying (and optionally milling) the resulting CWSTG. The heating and drying steps can be combined, as in the drum drying process. The milling step is preferred so as to produce minute particles which readily hydrolyze.

TKP subjected to this process exhibits cold-water solubility. As indicated, this process does not require the addition of bleaching agents, or any precipitation and/or filtration steps to yield CWSTG. The process conserves time of preparation, reduces reagent costs, and gives yields of approximately 100%. The constraints inherent in said process are governed by temperature, time, and pressure relationships; i.e., at lower temperatures, longer periods of time are required to develop full solubility.

CWSTG can be defined in terms of the viscosity of a solution prepared with cold water (i.e., 5°-35° C.) A CWSTG aqueous solution prepared by adding CWSTG powder to cold water and mixing under moderate shear (e.g., Lightnin Mixer at 800-1,000 rpm) for one hour develops a viscosity of greater than 10 CP (Brookfield LVF viscometer, spindle 1, 60 rpm) at a 1% concentration and greater than 1,000 CP (Brookfield LVF viscometer, spindle 3, 60 rpm) at 10% concentration.

Heating of the TKP/water mix can be accomplished by various methods, including, but not limited to, infrared irradiation, conventional steam heating, drum drying, and microwave heating. The temperature range necessary to achieve cold-water solubility is from 35° C. to just below degradation temperature of TKP; preferably 35°-130° C. TKP held at lower temperatures requires a longer time for viscosity to develop and does not develop the same viscosity as TKP held at higher temperatures. The optimum temperature range is 70°-100° C. at atmospheric pressure.

It is preferred that the TKP concentration range from 4% to 60%. A still more preferred range is 20% to 50%.

Algin and TKP can be blended to any desired ratio and stored as a blend until needed. These two components may be combined, each as a dry powder and stored as a dry-powder blend, or they initially may be put separately into solution and then the two solutions blended and stored as a wet blend or the separate solutions may be combined in the final formulation. The dry blends can be weighed and combined with other ingredients or first dissolved prior to further use. As tamarind kernel powder is not soluble in cold water, its entry into solution requires heating to approximately 82° C. Agitation by a mixer may also be required to put algin and TKP into solution. In the wet blend, solutions in the range preferably of 0.5% to 10.0% of each component are prepared and then added together to attain the desired blend ratio ranging from 90:10 to 5:95 algin:TKP by weight. Final concentrations of the blend ranging from approximately 0.5% to 10.0% then can be prepared depending on the intended end use (for example, concentrations of 0.9% to 4.0% are typical of blends in the paper industry). Solutions lower than 0.5% and higher than 10% may also be prepared.

Blends of algin and TKP yield unexpectedly high viscosities in aqueous solutions when compared to the predicted viscosities resulting from addition of the viscosities of the two components blended in solution.

The blends of algin and TKP have utility as additives for: thickening, suspending, emulsifying, stabilizing, gelling, lubricating, film-forming, and binding. In particular, the blends can be used in the following applications or products: can sealing, boiler compounds, latex creaming, welding-rod fluxes, brazing pastes, ceramic glazes and extrusions, cleaners and polishes, toys, emulsions (latex, asphalt, silicone), silver recovery, seed coatings, spray control for pesticides, emulsifiable concentrated and flowable pesticides, tobacco binders, water-based inks, lithographic fountain solutions, leather finishes, hydromulching and hydroseeding, textile printing and finishing, wet-end paper additives, wet-end paper retention and formation aids, anti-stick compounds, mold-release agents, liquid resins, slurry and packaged explosives, petroleum and water-well drilling muds, petroleum stimulation fluids, cosmetics, pharmaceutical suspensions and emulsions. This list is suggestive of the possible types of application in which these blends can be used.

The blends of algin and TKP are particularly useful in formulations used for textile warp sizing and for paper coating and surface sizing.

It should be noted that the pH of the aqueous dye-bath liquor of the invention can generally vary over a rather broad range although it will be appreciated that optimum pH limits will pertain to particular dye-bath systems.

After the textile material being treated has been impregnated with a desired dye by contact with the aqueous dye-bath liquor of the present invention, and the material has been dried by conventional means, the dye is fixed by heat or other means, e.g., by chemical action. Such fixation techniques are well known and established in the textile dyeing art.

It will be appreciated by those skilled in the art that a variety of additives may be present in the aqueous dye-bath liquor apart from the dye itself and the water with which it is associated in the dye-bath liquor. Such additives include dye assistants, carriers, promoters, and the like, and these may be employed in conventional amounts for their usual purposes in the practice of the present invention.

Table I presents various application of the novel blend of this invention in the printing and paper industry. Percentages of the blend recommended for usage in a wide variety of coatings is shown for both pigmented and nonpigmented coating.

TABLE I

| Coating | Major Ingredient (Parts by Weight) | | % Blend[1] | | % Total Solid | |
|---|---|---|---|---|---|---|
| | Pigment[2] | Binder[3] | Useful Range | Preferred | Useful Range | Preferred |
| Non-pigmented | | | | | | |
| 1. Calender Box | —[4] | 0–100 | 0.01–25 | 0.01–10 | 0.05–30 | 0.2–15 |
| 2. Size Press | — | 0–100 | 0.01–35 | 0.01–15 | 0.1–30 | 5–15 |
| 3. Blade Coater | — | 0–100 | 0.01–60 | 0.01–25 | 0.1–25 | 5–25 |
| Pigmented | | | | | | |
| 1. Wet-end Coater | 100 | 10–100 | 0.1–200 | 0.2–100 | 5–50 | 35–45 |
| 2. Size Press Coater | 100 | 3–30 | 0.1–200 | 0.1–3.0 | 5–60 | 25–50 |
| 3. Calender Box | 100 | 3–30 | 0.1–200 | 0.1–3.0 | 5–60 | 25–50 |
| 4. Roll Coater | 100 | 3–30 | 0.01–35 | 0.05–1.5 | 20–72 | 50–62 |
| 5. Air Knife Coater | 100 | 3–30 | 0.01–35 | 0.05–1.5 | 30–67 | 38–60 |
| 6. Blade Coater | 100 | 3–30 | 0.01–35 | 0.05–1.5 | 2–72 | 30–68 |
| 7. Rod Coater | 100 | 3–30 | 0.01–35 | 0.05–1.5 | 30–72 | 55–65 |
| 8. Cast Coater | 100 | 8–30 | 0.01–35 | 0.05–1.5 | 35–70 | 40–62 |
| 9. Gravure Coater | 100 | 3–30 | 0.01–35 | 0.05–1.5 | 35–72 | 40–65 |

[1] Values for non-pigmented coating are based on the total weight of coating; for pigmented coatings on the amount of pigment.
[2] Pigments include clay, $TiO_2$, $CaCO_3$, satin white, talc, etc.
[3] Binders include latex, casein, soya protein, starch, HEC, CMC, animal glue, etc.
[4] Minute amounts of pigment are often used for the purpose of filling the paper.

The blends are also useful as antimigrants in the pad dyeing of substrates. As used herein, substrate means a textile such as a woven, non-woven, or knitted fabric, and also yarns, threads, and fibers which can be pad dyed on a continuous basis.

The blends may be used in pad-dyeing operations with any available dyes and combinations thereof: e.g., disperse, direct, vat, reactive, or acid dyes.

Dye/blend antimigrant solutions may be used to print any substrate suitable for pad dyeing; for example, 100% polyester, 100% cotton, polyester/cotton blends in any ratio, corduroy, etc. The use level of the blend as an antimigrant will vary from 0.01% to over 5.00% based on the total weight of the dye-bath liquor with the blend concentration being preferably in the range of about 0.01% to 3.00% by weight. These levels will depend on the type of substrate and dye used as well as the method of application and drying procedure. At blend concentrations above 5%, the viscosity of the solution becomes a problem and such solutions are not recommended.

In the examples, reference is made to the following tests, all of which are recognized in the paper or textile industries. Parenthetical references are to standards of the Technical Association of the Pulp and Paper Industry, Inc., 1 Dunwoody Park, Atlanta, Ga., 30338, or to the American Association of Textile Chemists and Colorists.

PAPER INDUSTRY

1. Gurley densometer test: the film-forming property of a coating is measured by comparing at the same pressure and temperature the time in seconds it takes for 100 cc of air to pass through a 6.4 $cm^2$ piece of coated paper versus a piece of uncoated paper (i.e., air resistance). Air resistance indirectly indicates degree of beating absorbency (penetration of oil, water, etc.), apparent specific gravity, filtering efficiency, etc. (TAPPI 460 OS-75).

2. K & N ® mottle test: the ink holdout property of a coating, i.e., estimates of resistance of a sheet of paper or paperboard to the penetration of ink and varnish are obtained by this method. A drop of K & N ® gray oil-based ink is allowed to remain on a sample of treated paper and then is wiped off. Poor ink film leveling gives a mottled appearance to the paper, which is rated on a scale of 0 to 10 (poor to good). (TAPPI 553)

K & N ® is a registered trademark of K & N ® Laboratories, Inc., 5331 Donsher Road, Countryside, Il., 60525.

3. Vanceometer test: a simulation test of ink and solvent holdout (i.e., oil resistance) of a paper surface by measuring reflectance of a paper surface offered with a thin film of mineral oil after 30 and 60 seconds. High percentage reflectance simulates high ink and solvent holdout, which is desired for most paper applications. Reflectance is measured on a Vanceometer absorption tester and is given in % reflectance. (TAPPI 519.)

4. Gloss ink test: involves the printing of a thin film of Litho Gloss ink (obtained from Custom Inks & Coatings Co.). After drying, a measurement is made on a Photovolt Reflectometer Model 670 with the TAPPI 75° Gloss Sensing Unit Model 660-P. A higher figure indicates better ink holdout paper surface. This test is widely used as a partial measure of the surface quality and shiny appearance of coated paper. (TAPPI 480 os-78).

5. IGT ink drop test: this test measures pick resistance of paper by close simulation of the printing process. It simulates the ink holdout of a paper surface subjected to printing press nip pressure conditions (i.e., pick resistance of the paper). The spread size (in mm²) of 0.3 ml of dibutylphtalate is measured on an IGT printability tester (Research Institute for Printing & Allied Industries TNO, P.O. Box 4150, Amsterdam, Holland) at B setting, 40 kg nip pressure. Larger spread size indicates better ink holdout, which is desirable for gravure, litho, and letter-press applications. (TAPPI T499 su-64).

6. Antimigrant Test:

TEXTILE INDUSTRY

A substrate is padded through a dye- and auxiliary-containing bath, is padded to a specified pick-up level, and finally is placed on a flat, nonporous surface (e.g., glass plate) and covered with a watch glass. The watch glass serves to minimize any evaporation and, thus, aids assessment of any particulate migration in the liquid phase by forcing the migration to occur horizontally through the substrate interior, i.e., from the watch-glass covered area to the uncovered area. (AATCC test method 140-1974).

7. Tensile strength and elongation: the major benefit to be tested is if the ingredients added to the dye plasticize the film without affecting the elongation. Desirable measurements would then include high tensile strength with high elongation (approximately 10–15% elongation is necessary). This test measures desirable properties for a warp size used during the weaving of a fabric.

General

8. Brookfield viscosity measurements: solution viscosities are measured using a Brookfield LVF viscometer. Data are given in centipoise (CP). All readings are at room temperature unless otherwise specified. The synergism values used herein are obtained by comparing the actual viscosities observed to the theoretical values calculated using the following formulae for a blend x:y $$cP_{cal'd} = (\%x \cdot \text{viscosity } x) + (\%y \cdot \text{viscosity } y)$$

$$\% \text{ syn.} = \frac{cP_{act} - cP_{cal'd}}{cP_{cal'd}} \cdot 100$$

EXAMPLE 1

Viscosity Measurements

2% and 3% solutions by weight of sodium alginate, cold-water soluble tamarind kernel powder (CWSTG), and various blends of sodium alginate: CWSTG are prepared in distilled water. Viscosity measurements are made on a Brookfield LVT viscosometer 60 rpm at 25° C. For the 2% solutions, spindle 2 is used; for 3%, spindle 3. The data of Table II are obtained.

These data show that blends of algin:TKP exhibit synergistic viscosities over an extremely wide range of blend ratios. A preferred blend, where increased viscosity is desired, is a blend which ranges from 75:25 to 10:90 algin:TKP.

TABLE II

| Concentration | Algin:TKP Viscosities | | | | | | | |
|---|---|---|---|---|---|---|---|---|
| | 100:0 | 90:10 | 75:25 | 50:50 | 25:75 | 10:90 | 5:95 | 0:100 |
| 3% | | | | | | | | |
| meas. | 520 | 720 | 900 | 1190 | 1190 | 1020 | 950 | 770 |
| cal'd | — | 545 | 582 | 645 | 707 | 745 | 757 | — |
| % Synergism | — | — | 32 | 55 | 84 | 68 | 37 | 22 | — |
| 2% | | | | | | | | |
| meas. | 170 | 190 | 230 | 280 | 300 | 250 | — | 170 |
| cal'd | — | 170 | 170 | 170 | 170 | 170 | — | — |
| % Synergism | — | — | 12 | 35 | 65 | 47 | — | — |

EXAMPLE 2

20:80 Dry Blend

Sodium alginate and tamarind kernel powder are dry mixed in the ratio 20:80. The mix is dissolved in deionized water by heating to 74° C. for 20 minutes with stirring. The solution is cooled to room temperature and concentrations of 0.5, 1, and 2% are prepared. These solutions are tested and the raw data extrapolated to a standard dry coat weight of 0.05g/m². The results of the extrapolations are shown in Table III.

EXAMPLE 3

33:67 Wet Blend

CWSTG and sodium alginate are dissolved separately in deionized water and then added individually into a pigmented coating formulation suitable for coating methods such as size press, blade, air knife, roll and rod coating as follows:

| Components: | Amount (parts dry by weight) |
|---|---|
| Clay, No. 1 coating grade | 100.00 |
| CALGON ®, tetrasodium pyrophosphate | 0.20 |
| DISPEX ® N40, organic dispersant | 0.20 |
| DOW LATEX ® 638, latex binder | 15.00 |
| TAMOL ® 850, acrylic dispersing agent | 0.16 |

-continued

| Components: | Amount (parts dry by weight) |
| --- | --- |
| Sodium alginate/TKP blend (33:67) | 0.60 |
| Final concentration (% solids) | 60.00 |

®CALGON is a registered trademark of MERCK & CO., INC.
DISPEX is a registered trademark of Allied Colloids, Inc.
DOW LATEX is a registered trademark of Dow Chemical Co., U.S.A.
TAMOL is a registered trademark of Rohm and Haas.

TABLE III

| | 20:80 Paper Coating | | |
| --- | --- | --- | --- |
| SAMPLE | Gurley Densometer | K & N Mottle | Gloss Ink Test |
| Control Paper | 30 | 0 | No test |
| Paper coated with sodium alginate | 78 | 7 | 36 |
| Paper coated with TKP | 45 | 5 | 33.6 |
| Paper coated with sodium alginate: TKP (20:80) CALCULATED | 53 | 5.2 | 34 |
| Paper coated with sodium alginate: TKP (20:80) MEASURED | 72 | 5.6 | 34.7 |

Part of the 60% solution is diluted to concentrations of 45% and 50%. A puddle-blade coater is used to coat the three solutions on a slack-sized label paper at 50 ft/min. operational speed. Controls with 100% sodium alginate and 100% CWSTG are similarly prepared. The data of Table IV are obtained as in Example 2, except that the data are extrapolated to a dry coat weight of 5 g/m².

TABLE IV

| | 33:67 Pigmented Coating | |
| --- | --- | --- |
| SAMPLE | K & N Mottle Test | Gloss Ink Test |
| Control, pigmented coating without gum | 4.5 | 53 |
| Coating with sodium alginate | 8.0 | 60 |
| Coating with TKP | 5.0 | 54 |
| Coating and algin:TKP (33:67) CALCULATED | 6.0 | 56 |
| Coating with algin:TKP (33:67) MEASURED | 7.5 | 57 |

EXAMPLE 4

25:75 Algin:TKP As An Antimigrant

A blend of 25:75 low-viscosity sodium alginate: tamarind kernel powder is made up in water at a 15% concentration by heating the solution to 75° C. under constant agitation. The concentrate's temperature is held at 75° C. for 15 minutes, then allowed to cool to room temperature. The concentrate then is used as an antimigrant in the following formulation:

| | Amount (grams) |
| --- | --- |
| Concentrate | 20 |
| PALACET ® Black 2-PAT (disperse dye) | 45 |
| TERGITOL ® 15-S-9 (wetting agent) | 0.1 |
| Water | To make 1 liter solution |

®PALACET is a registered trademark of BASF Wyandotte Company.
TERGITOL is a registered trademark of Union Carbide Corporation.

The resulting dye bath is padded onto 100% polyester fabric at a pick-up of 75%, based on the weight of the fabric. The fabric then is dried, with the dye first being fixed using steam at 20 psi for 40 minutes; subsequently, it is washed and dried. The resulting uniform, even color over the entire piece of fabric demonstrates the sodium alginate/TKP blend's usefulness as an antimigrant.

EXAMPLE 5

10:90 Algin:TKP Blend as a Warp Size

A 10% aqueous gum solution of 10:90 sodium alginate:CWSTG is prepared. The solution contains the plasticizing agent glycerine in the ratio blend:glycerine 100:10. Controls of 100:10 algin:glycerine and TKP:glycerine are also prepared. Films are prepared on glass plates by drawing down said 10% gum solutions with a doctor blade. After drying, the films are removed from the glass and conditioned at 70% humidity at 25° C. for 3 days. The data of Table V are obtained.

TABLE V

| | 10:90 Algin:TKP Warp Size | |
| --- | --- | --- |
| Sample | Tensile Strengh (psi) | % Elongation |
| Algin:Gly 100:10 | 4000 | 15.25 |
| TKP:Gly 100:10 | 4275 | 3.80 |
| Algin:TKP:Gly 10:90:10 CALCULATED | 4248 | 5.0 |
| MEASURED | 5000 | 16.0 |

For a warp size to be effective during weaving, high tensile strength must be accompanied by at least 10–15% elongation. This example demonstrates the unexpected improvement in both tensile strength and elongation exhibited by this novel blend of gums.

A major unexpected benefit obtained by blending algin and TKP is the ability of the blend to retain film plasticity without adversely affecting tensile strength. Fabric flexibility is crucial during weaving as the threads will crack if they exhibit insufficient plasticity upon travel through the weaving machinery and exhibit insufficient tensile strength upon stretching.

EXAMPLE 6

TKP is dispersed in water to a concentration of 20%, heated to 95° C. for 10 minutes, then dried and milled. The resulting product is dissolved in water at 20° C. and develops a viscosity of 35 cP at 1% concentration, measured on a Brookfield LVF viscometer, spindle 1, 60 rpm.

EXAMPLE 7

TKP is dispersed in water at ambient temperature at a concentration of 40%. The resulting paste is drum dried with internal steam pressure at 40 psi, and then milled. The resulting product readily dissolves in ambient-temperature water and imparts a viscosity of 30 cP at 1% concentration, measured on a Brookfield LVF viscometer, spindle 1, 60 rpm.

EXAMPLE 8

Comparisons of TKP vs CWSTG

A 3% dispersion of TKP is made up by dispersing the TKP in water at room temperature. A solution of CWSTG as prepared in Example 6 is also made up as a 3% solution at room temperature. The viscosities of the dispersion and the solution are measured after 15 minutes of mixing at 1200 rpm on a Lightnin Mixer. The viscosity of the TKP is less than 2 cP as measured on a Brookkfield LVF viscometer, spindle 1, 60 rpm, compared with the viscosity of the CWSTG which is 400 cP as measured on the Brookfield LVF viscometer, spindle 3, 60 rpm.

The respective viscosities are remeasured after 4 hours of mixing. The TKP imparts a viscosity of 10 cP whereas the CWSTG imparts a viscosity of 1,100 cP. These viscosities remain unchanged after 24 and 48 hours.

EXAMPLE 9

TKP is processed according to the purification process detailed in U.S. Pat. No. 3,399,189 and compared to CWSTG as prepared by Example 7. Compositional analysis shows the following differences between the two gums:

| | % Protein | % Uronic Acid | % Molar Ratios NEUTRAL SUGARS | | | | |
|---|---|---|---|---|---|---|---|
| | | | Arabinose | Xylose | Mannose | Glucose | Galactose |
| CWSTG | 15.0 | 7.5 | 7.0 | 31.0 | trace | 48.0 | 14.0 |
| Processed TKP | 7.0 | 9.0 | 5.0 | 36.0 | — | 45.0 | 14.0 |

What is claimed is:

1. A blend of algin and TKP wherein the weight:weight ratio of algin to TKP ranges from about 90:10 to 5:95.

2. The blend of claim 1 where the algin is sodium alginate or propylene glycol alginate and TKP is selected from the group consisting of tamarind kernel powder, cold-water soluble tamarind kernel powder, tamarind polysaccharide, tamarind seed jellose, and the tamarind kernel constituents.

3. The blend of claim 2 wherein algin is sodium alginate and TKP is selected from the group consisting of tamarind kernel powder, cold-water soluble tamarind kernel powder, tamarind polysaccharide, and tamarind seed jellose.

4. The blend of claim 3 wherein the algin:TKP ratio ranges from 50:50 to 5:95.

5. The blend of claim 3 wherein the algin:TKP ratio ranges from 20:80 to 5:95.

6. An aqueous blend of claim 3 prepared by prehydrating each gum prior to blending.

7. A non-pigmented paper coating consisting essentially of water, binder and algin:TKP blend wherein the weight:weight ratio of algin to TKP ranges from 90:10 to 5:95.

8. The coating of claim 7 where relative to the total coating weight the blend weighs 0.01 to 35%.

9. The coating of claim 8 where the algin:TKP ratio ranges from 50:50 to 5:95.

10. The coating of claim 8 where the algin:TKP ratio ranges from 20:80 to 5:95.

11. The coating of claim 10 where relative to the total coating weight the blend weighs 0.01 to 35%.

12. The coating of claim 10 where relative to the total coating weight the blend weighs 0.05 to 15%.

13. A pigmented paper coating consisting essentially of water, pigment, binder and an algin:TKP blend wherein the weight:weight ratio of algin to TKP ranges from 90:10 to 5:95.

14. The coating of claim 13 where the algin:TKP ratio ranges from 50:50 to 5:95.

15. The coating of claim 13 where the algin:TKP ratio ranges from 20:80 to 5:95.

16. The coating of claim 15 where relative to the pigment the blend weighs from 0.05 to 200%.

17. The coating of claim 15 where the pigment weighs from 0.05 to 50%.

18. The coating of claim 17 where the pigment weighs from 0.3 to 1.5%.

19. In an aqueous dye-bath liquor suitable for impregnating substrates, the improvement that comprises the incorporation in said dye-bath liquor, as an antimigrant, of an algin:TKP blend wherein the TKP is tamarind kernel powder or cold-water soluble tamarind kernel powder and wherein the weight:weight ratio of algin to TKP ranges from 90:10 to 5:95 said blend's concentration ranging from about 0.01 to about 5.00% by weight based on the total weight of said dye-bath liquor.

20. The dye bath of claim 19 wherein TKP is selected from the group consisting of tamarind kernel powder, cold water soluble tamarind kernel powder, tamarind polysaccharide, and tamarind seed jellose, and the blend concentration ranges from 0.1% to 0.3%.

21. The dye bath of claim 20 wherein the algin:TKP ratio ranges from 50:50 to 5:95.

22. The dye bath of claim 20 wherein the algin:TKP ratio ranges from 20:80 to 5:95.

* * * * *

UNITED STATES PATENT AND TRADEMARK OFFICE
CERTIFICATE OF CORRECTION

PATENT NO. : 4,257,768
DATED : March 24, 1981
INVENTOR(S) : Joseph S. Racciato et al It is certified that error appears in the above—identified patent and that said Letters Patent is hereby corrected as shown below:

Please note that Claim 20 should read:

-- 20. The dye bath of Claim 19 wherein the blend concentration ranges from 0.1% to 0.3%. --

Signed and Sealed this

Second Day of June 1981

[SEAL]

Attest:

RENE D. TEGTMEYER

Attesting Officer     Acting Commissioner of Patents and Trademarks